United States Patent [19]

Arima et al.

[11] Patent Number: 4,937,274
[45] Date of Patent: Jun. 26, 1990

[54] COATING COMPOSITION

[75] Inventors: Masamichi Arima; Gorou Nagao; Fumikazu Matsuda, all of Osaka, Japan

[73] Assignee: Nippon Paint Co., Ltd., Osaka, Japan

[21] Appl. No.: 215,753

[22] Filed: Jul. 6, 1988

[30] Foreign Application Priority Data

Jul. 6, 1987 [JP] Japan .................. 62-168017

[51] Int. Cl.$^5$ .................. C08K 5/29; C08K 3/34; C08K 3/20; C08K 3/08
[52] U.S. Cl. .................. 523/220; 524/88; 524/439; 524/440; 524/441
[58] Field of Search .................. 523/220; 524/88, 439, 524/440, 441

[56] References Cited

U.S. PATENT DOCUMENTS

| | | | |
|---|---|---|---|
| 4,434,009 | 2/1984 | Banba | 524/441 |
| 4,522,958 | 6/1985 | Das et al. | 523/220 |
| 4,590,235 | 5/1986 | Troy | 524/88 |
| 4,675,385 | 6/1987 | Frangou | 524/441 |

Primary Examiner—Lewis T. Jacobs
Attorney, Agent, or Firm—Wenderoth, Lind & Ponack

[57] ABSTRACT

A coating composition comprising metallic flake pigments having an average thickness of 0.5 to 1.5$\mu$ and an average diameter of 10 to 45$\mu$, selected from the group consisting of aluminium flakes, bronze flakes, tin flakes, gold flakes, silver flakes, titanium flakes, stainless steel flakes, nickel flakes, copper flakes, their alloyed metal flakes, plastic-coated metal flakes and flake phthalocyanine blue, and ultra-fine particles having an average particle diameter of 5 to 400 m$\mu$, the weight ratio of said flake pigments to ultra-fine particles being 1:0.05 to 1:12, uniformly dispersed in a thermosetting resin vehicle. The present coating composition is useful as a top coat and especially as a base coat composition for 2-coat-1-bake coating system for automobile body, appliance or the like, resulting an excellent metallic effect and decorative interference color effect.

3 Claims, No Drawings

COATING COMPOSITION

FIELD OF THE INVENTION

The present invention relates to a coating composition which contains no interference mica pigment but still capable of resulting a coating with excellent decorative interference color.

BACKGROUND OF THE INVENTION

From an ever increasing demand for high grade articles especially in an automobile and an appliance industry, public attention has been directed to a technique wherein an interference mica pigment is compounded with a coating composition, thereby expecting a decorative interference color of the pigment used. However, such pigments are in general, very expensive and hence economic problems are always encountered in the development of this kind of technique.

It is, therefore, an object of the invention to provide a coating composition which does not include any interference mica pigments but still capable of resulting a coating with excellent decorative interference color and metallic appearance, just like the coating containing the interference mica pigments and aluminium flake.

It is an additional object of the invention to provide a coating composition which is to be used as a metallic base coat composition in two-coat-one back coating system for automobile body, appliance or the like, resulting in a coating with excellent glossiness and interference color effect.

SUMMARY OF THE INVENTION

According to the present invention, the aforesaid objects can be attained with a coating composition which comprises metallic flake pigments having an average thickness of 0.5 to 1.5μ and an average diameter of 10 to 45μ, selected from the group consisting of aluminium flakes, bronze flakes, tin flakes, gold flakes, silver flakes, titanium flakes, stainless steel flakes, nickel flakes, copper flakes, their alloyed metal flakes, plastic-coated metal flakes and flake phthalocyanine blue, and ultra-fine particles having an average particle diameter of 5 to 400 mμ, the weight ratio of said flake pigments to ultra-fine particles being 1:0.05 to 1:12, uniformly dispersed in a thermosetting resin vehicle.

The most preferable coating composition which can result a coating with excellent glossiness and interference color and is specifically useful as a base coat composition in 2-coat-1-bake coating system for automobile body, appliance or the like, comprises aluminium flake pigments having an average thickness of 0.5 to 1.5μ and an average diameter of 10 to 45μ, and ultra-fine particles having an average particle diameter of 5 to 400mμ, the weight ratio of said aluminium flake pigments to the ultra-fine particles being 1:0.05 to 1:12, whose pigment concentration is 50% by weight or less and aluminium content is 15% by weight or less.

In this invention, as the metallic flake pigments, any of the following may be satisfactorily used: alminium flake, bronze flakes, tin flakes, gold flakes, silver flakes, titanium flakes, stainless steel flakes, nickel flakes, copper flakes, their alloyed metal flakes, plastic coated metal flakes and flake phthalocyanine blue. Among them, particular preference is given to aluminium flakes, nickel flakes, bronze flakes, and stainless steel flakes, having an average thickness of 0.5 to 1.5μ and an average diameter of 10 to 45μ. Examples of such pigments are Alpaste 7130N, 7160N, 7770N, Miraglow 1000, Alpaste 52-509 (all trademarks of Aluminium flakes manufactured by Tokyo Aluminium Co. Ltd.); Silver line, MC-404 (trademarks of aluminium flake manufactured by Asahi Kasei); various marketed stainless steel flakes, nickel flakes and bronze flakes.

In the present invention, in order to obtain the desired interference color effect, 0.05 to 12 parts (by weight) of ultra-fine particles having an average particle diameter of 5 to 400 mμ are compounded with 1 part of the aforementioned metallic flake pigments.

As thd ultra-fine particles, any of inorganic or organic materials may be satisfactorily used, providing having the defined particle size. Particularly preferable materials are metal oxides as iron oxide, titanium oxide and zirconium oxide, inorganic materials as silicon oxide, sand and the like, and organic materials as cross-linked polymer particles.

The resin vehicle used is of a thermosetting nature.

For this purpose, heat curing type, film-forming resin as acryl resin, polyester resin, alkyd resin, epoxy resin and the like is used with a crosslinking agent as melamine resin, blocked polyisocyanate compound and the like. However, the most preferable combinations are thermosetting type acryl resin and melamine resin.

The inventors have now surprisingly found that when ultra-fine particles having an average particle diameter of 5 to 400 nm are co-used with the metallic flake pigments, very attractive interference color can be realized, comparable wich those of the conventional interference mica pigments, as well as the metallic effect of the flake pigment used. The clarity of the ultra-fine particles may vary with the average particles size, and when the particles are very small, i.e less than 5 mμ, its transparency is excessively high to obtain the desired interference color with the combination of said metallic flake pigments whereas when the particles are more than 400 mμ in size, its non-tranparency is undesirably increased and the desired interference color effect cannot be obtained, too.

It has also been found that from the standpoint of the hiding power of the resulted coating composition, the weight ratio of said metallic flake pigments to the ultra-fine particles should preferably be in a range of 1:0.05 to 1:12, more preferably 1:0.4 to 1:5.

As an important application of the present coating composition, mention is made of 2-coat-1-bake coating system for metallic coating of automobile body or the like. In that application, an iron plate is usually treated with a chemical pretreatment bath, applied with an electro coating (dry film thickness of 15 to 30μ), and then with an intermediate coat (dry film thickness of 35 to 40μ), dry-baked, optionally subjected to rubbing in water, and finally subjected to 2-coat-1-bake treatment using a base top coat composition and a transparent top coat composition. Upon final baking, cured base coat (dry film thickness of 10 to 20μ) and transparent coat (dry film thickness of 25 to 40μ) are formed on the iron plate.

In a conventional mica-containing metallic coat, aluminium flake and interference mica pigments are added to said base top coat composition.

In this invention, the said base top coat composition is replaced by the present coating composition.

More specifically, various kind of flake pigments are used as substitute for the aluminium flake and ultra-fine particles are as substitute for the interference mica pigment. Usually, colored pigments are added to the base top coat, too and however, addition of said pigments is optional.

In a conventional metallic coating, the flake pigments are limited to aluminium flakes only. This is because specific gravities of other metals as bronze are considerably high and there always occure darkening of metallic color.

However, in this invention, various metal flakes as above-mentioned may be satisfactorily used together with ultra-fine particles.

The inventors have also found that when the present coating composition is used as a substitute for the above-mentioned base top coat composition, the total pigment concentration of the present composition should preferably be maintained at 50% by weight or less of the total solid.

This is because, if the said concentration exceeds the upper limit of 50% by weight, there is a risk of the final finish being deteriorated due to the suction of transparent top coat components into the base coat composition.

The metallic flake pigment concentration should preferably be maintained at the level of 15% or less of the total solid and the weight ratio of the metallic flake pigment to the ultra-fine particles should preferably be maintained in a range of 1:0.05 to 1:5.

This is because, if the metallic flake pigment concentration exceeds over the upper limit of 15% of the total solid, there is an undesirable loss in gloss, and if the amount of said ultra-fine particles to 1 part of the metallic flake pigment exceeds over the upper limit of 5 parts, there is a deficient hiding power of the coating composition often causing discrepancy in color tone. Whereas, if the amount of the ultra-fine particles to 1 part of the metallic flake pigment is lower than 0.05 part, there is a deficient interference color effect and loss in gloss.

Therefore, as a substitute for the heretofor proposed base top coat composition, the present coating composition should proferably contain metallic flake pigments having an average thickness of 0.5 to 1.5$\mu$ and an average diameter of 10 to 45$\mu$, most preferably aluminium flake pigments, and the ultra-fine particles having an average particle diameter of to 400 m$\mu$, most preferably titanium oxide particles, in a weight ratio of 1:0.05 to 1:12, most preferably 1:0.4 to 1:5, the total pigment concentration being fixed at 50% by weight or less and the metallic flake pigment concentration 15% by weight or less. Thus, in the present invention, a novel base top coat composition capable of resulting a coating with excellent decorative interference color and excellent glossiness and being specifically useful in 2-coat-1-bake coating system for metallic coating of automobile body or the like is provided.

In such an application, colored pigments are usually added to the base top coat composition and therefore, the present composition may include other colored pigments. At that time, the aforesaid total pigment concentration should be interpreted as indicating the concentration of total sum of the metallic flake pigment, ultra-fine particles and other colored pigments.

The inventors have also found that in a two-coat-one-bake coating system using a base top coat composition and a transparent top coat composition and the combination of metallic flake pigment, ultra-fine particles and other colored pigments, said transparent top coat composition may include a part of the ultra-fine particles or a part of said ultra-fine particles and said metallic flake pigment, thereby attaining the same present objects, providing the above-mentioned, metallic flake pigment concentration is maintained, as well as the weight ratio of the metallic flake pigments to the ultra-fine particles and the total pigment concentration.

Therefore, in a modification of such 2-coat-1-bake coating system, the present coating composition may be used as both base coat composition and transparent top coat composition. For the convenience sake of better understanding of the invention, the coating composition of this invention shall be hereinunder explained without making distinctions between the base top coat containing other colored pigments and the base top coat containing no other such colored pigments, and between the base top coat and the transparent top coat to be placed on the said base top coat. The binder resin varnish shall be represented by the combination of acryl resin and melamine resin.

In preparing the present coating composition, the defined amounts of the metallic flake pigment and ultra-fine particles are uniformly dispersed in the binder resin varnish in a conventional way.

In one preferable preparation method, said ultra-fine particles are first uniformly dispersed in an amount of acryl resin, which is then diluted with a combination of acryl resin and melamine resin to obtain a first dispersion. Separately, the metallic flake pigment is dispersed, while applying a slight pressure, in a combination of the same acryl and melamine resins, and thus obtained dispersion is mixed with the abovementioned first dispersion to obtain the present coating composition.

In an another method, the present coating composition may be prepared by providing a dispersion of metallic flake pigment in an organic solvent and a dispersion of ultra-fine particles in a thermosetting type acryl resin varnish and mixing the abovesaid dispersions and melamine resin varnish to obtain the desired coating composition.

Though the invention has been stated in connection with the most preferable coating composition, the invention shall be modified, without departing from the inventive concept disclosed, in various other ways, as, for example, using two separate top coat compositions of which one contains metallic flake pigments and ultra-fine particles and the other contains the ultra-fine particles, or using the combination of transparent top coat containing ultra-fine particles and the base coat containing both metallic flake pigment and ultra-fine particles and the like.

The present coating composition is likewise useful as a top coat for various metal substrates, appliance and the like, with or without containing colored pigments, too.

This invention shall be now more fully explained in the following examples. Unless otherwise being stated, all parts and percentages are by weight.

EXAMPLE 1

An aluminum pigment paste was prepared by mixing 5.7 parts of Alpaste 7130N (Trade mark, aluminum flake pigment having an average grain diameter of 45$\mu$, manufactured by Toyo Aluminum K.K.) and 5.7 parts of toluene in a stainless steel vessel.

Separately, in another stainless steel vessel, a ultra-fine particle dispersion was prepared by mixing 42.8 parts of ultra-fine particles of titanium dioxide (TTO-50A, Ishihara Sangyo K.K., average grain diameter of 50 m$\mu$) and 89.2 parts of Almatex NT-U-488 (thermosetting type acryl resin varnish, Solid content 48%, trademark of Mitsui Toatsu Chem. K.K.), and subjecting to a dispersion operation by using a disper with the same volume of glass beads with that of the abovesaid mixture, for 60 minutes.

To the thus obtained titanium dioxide paste, were added the aluminum pigment paste described above and 17.8 parts of melamine resin varnish (Super Beckamine J-820-60, trademark of Dainihon Ink Chemical K.K., solid content of 60%) and the mixture was despersed by using disper for 30 minutes. Thereafter the glass beads were removed by filtration to obtain the paint solution.

EXAMPLE 2 to 14

The same procedures as stated in Example 1 were repeated with the same materials as given in Example 1 and however, their amounts were changed as shown in the following Table 1 to obtain the respective paint solution.

EXAMPLE 15

The same procedures as stated in Example 2 were repeated, excepting substituting Alpaste 7160N (Aluminum flake pigment, trademark of Toyo Aluminum K.K., average grain diameter of 35μ) for Alpaste 7130N in Example 2 to obtain the paint solution.

COMPARATIVE EXAMPLE 1

An aluminum pigment paste was prepared by mixing 20 parts of an aluminum flake pigment (Alpaste 7130N) and 20 parts of toluene and dispersing them uniformly. To this, was then added 145 parts of thermosetting acrylic resin varnish (Almatex NT-U-448) and 29 parts of melamine resin varnish (Super Beckamine J-820-60) and the mixture was dispersed by using a disper for 30 minutes to obtain the paint solution.

COMPARATIVE EXAMPLE 2

Into a stainless steel vessel, were placed 13 parts of ultra-fine particles of titanium dioxide (TTO-50A), 145 parts of thermosetting type acrylic resin varnish (Almatex NT-U-448) and 29 parts of melamine resin varnish (Super Beckamine J-820-60) and the mixture was dispersed by using a disper with about the same volume of glass beads as that of the mixture described above for 60 minutes and then subjected to filtration to obtain the paint solution. The compounding ratio of the respective raw material, percentage of the sum of metallic flake pigment and ultra-fine particles in the total solid matter of the respective paint, i.e. pigment weight concentration, and the weight ratio of metallic flake pigment to the ultra-fine particles are shown in Table 1.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Aluminum flake pigment | average grain diameter 45[*1] | 5.7 | 14.3 | 23.1 | 33.2 | 44.9 | 11.7 | 16.0 | 18.3 | 20.5 |
| | average grain diameter 35[*2] | — | — | — | — | — | — | — | — | — |
| | average grain diameter 25[*3] | — | — | — | — | — | — | — | — | — |
| toluene | | 5.7 | 14.3 | 23.1 | 33.2 | 44.9 | 11.7 | 16.0 | 18.3 | 20.5 |
| ultra-fine particles of titanium dioxide[*4] | | 42.8 | 40.3 | 37.8 | 34.8 | 31.5 | 33.0 | 26.0 | 19.2 | 14.4 |
| thermosetting type acrylic resin varnish[*5] | | 89.2 | 84.0 | 78.7 | 72.7 | 65.5 | 99.0 | 106.0 | 114.8 | 120.5 |
| melamine resin varnish[*6] | | 17.8 | 16.8 | 15.7 | 14.5 | 13.1 | 19.8 | 21.2 | 23.0 | 24.1 |
| total amount | | 161.2 | 169.7 | 178.4 | 188.4 | 199.9 | 175.2 | 185.2 | 193.6 | 200.0 |
| pigment weight concentration (%) | | 46.5 | 49.6 | 52.8 | 56.4 | 60.7 | 40.6 | 36.4 | 31.1 | 27.7 |
| weight ratio of flake pigment/ ultra-fine particles | | 1/11.5 | 1/4.2 | 1/2.6 | 1/1.6 | 1/1.1 | 1/4.3 | 1/3.7 | 1/1.6 | 1/1.1 |

| | | Example | | | | | | | Comparative Example | |
|---|---|---|---|---|---|---|---|---|---|---|
| | | 10 | 11 | 12 | 13 | 14 | 15 | 16 | 1 | 2 |
| Aluminum flake pigment | average grain diameter 45[*1] | 20.0 | 20.0 | 20.0 | 20.0 | 20.0 | — | — | 20.0 | — |
| | average grain diameter 35[*2] | — | — | — | — | — | 14.3 | — | — | — |
| | average grain diameter 25[*3] | — | — | — | — | — | — | 14.3 | — | — |
| toluene | | 20.0 | 20.0 | 20.0 | 20.0 | 20.0 | 14.3 | 14.3 | 20.0 | — |
| ultra-fine particles of titanium dioxide[*4] | | 13.0 | 8.7 | 5.6 | 3.2 | 1.4 | 40.3 | 40.3 | — | 13.0 |
| thermosetting type acrylic resin varnish[*5] | | 123.3 | 130.5 | 135.7 | 139.7 | 142.7 | 84.0 | 84.0 | 145.0 | 145.0 |
| melamine resin varnish[*6] | | 24.7 | 26.1 | 27.1 | 27.9 | 28.5 | 16.8 | 16.8 | 29.0 | 29.0 |
| total amount | | 201.0 | 205.3 | 208.4 | 210.8 | 212.6 | 169.7 | 169.7 | 214.0 | 214.0 |
| pigment weight concentration (%) | | 26.0 | 21.7 | 18.6 | 16.2 | 14.4 | 49.6 | 49.6 | 13.0 | 13.0 |
| weight ratio of flake pigment/ ultra-fine particles | | 1/1 | 1/0.7 | 1/0.4 | 1/0.3 | 1/0.1 | 1/4.2 | 1/4.2 | — | — |

[*1]Alpaste 7130N, Toyo Aluminum K.K.
[*2]Alpaste 7160N, Toyo Aluminum K.K.
[*3]Alpaste 7770N, Toyo Aluminum K.K.
[*4]TTO-50A, Ishihara Sangyo K.K., average grain diameter of 50 mμ.
[*5]Almatex NT-U-448, Mitsui Toatsu Chemical K.K., resin solid content of 48%.
[*6]Super Beckamine J-820-60, Dainihon Ink. Chemical K.K., resin solid content of 60%.

EXAMPLE 16

The same procedures as stated in Example 2 were repeated, excepting substituting Alpaste 7770N (Aluminum flake pigment, trademark of Toyo Aluminum K.K., average grain diameter of 25μ) for Alpaste 7130N in Example 2 to obtain the paint solution.

Preparation of coated test panels

Steel panels (500mm in length, 300mm in width, and 0.8mm in thickness) were treated with a zinc phosphate surface pretreatment agent (Granodine SD5000, trademark of Nippon Paint K.K.) by a conventional method and then primed with an electrodeposition coating (Power Top U-30, trademark of Nippon Paint K.K., epoxyurethane cationic resin) by a conventional electrodeposition method in dry film thickness of 20μ. Thereafter, an intermediate coating (Orga P-2 grey, trademark of Nippon Paint K.K., polyester melamine resin) was applied by a conventional method in dry film thickness of 35μ.

Over this, the respective paint solution (top coating) shown in Table 1 was applied by an electrostatic spraying means using a spray gun (Nozzle cap No.6, REA, Nippon Ransburg K.K.), after having diluted with a paint thinner (Nippe 298, Nippon Paint K.K.) to a viscosity of 13"/20° C. by Ford cup No.4. The same spraying was again applied to with an intervention of 1 minute flash off, thereby forming a coating of dry film thickness of 15μ. Thereafter, a clear coating (Superlac O-28L, trademark of Nippon Paint K.K., acrylmelamine resin) was applied to in a wet on wet manner and the formed coatings were baked at 140° C. for 20 minutes. The total dry film thickness was about 110μ. The coated panels thus obtained were then subjected to various tests. The test results are shown in Table 2.

TABLE 2

| | Example | | | | | | | | | | | | | | | | Comparative Example | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 1 | 2 |
| state of interference light reflection(*1) | ◯ | ◯ | ◎ | ◎ | ◎ | ◎ | ◎ | ◎ | ◎ | ◯ | ◯ | ◯ | △ | △ | ◎ | ◎ | X | X |
| glossy appearacne(*2) | ◯ | ◯ | X | X | X | ◯ | ◯ | ◯ | ◯ | ◯ | ◯ | ◯ | ◯ | ◯ | ◯ | ◯ | ◯ | ◯ |
| hiding power(*3) | △ | ◯ | ◯ | ◯ | ◯ | ◯ | ◯ | ◯ | ◯ | ◯ | ◯ | ◯ | ◯ | ◯ | ◯ | ◯ | ◯ | X |

(*1)The state of interference light reflection was evaluated by visual observation.
◎ ... excellent
◯ ... good
△ ... fair
X ... no good. (no interference light)

(*2)The state of glossy appearance of the coating surface was evaluated by visual observation.
◎ ... excellent
◯ ... good
△ ... fair
X ... no good (*3)The hiding power was evaluated by visual observation, when the respective top coating corresponding to each Example and Comparative Example was applied over the intermediate coating to a dry film thickness of about 15μ.
◎ ... excellent
◯ ... good
△ ... fair
X ... no good

What is claimed is:

1. A coating composition capable of producing a coating with an excellent gloss and a decorative interference color, without relying on an interference mica pigment, which comprises metallic flake pigments having an average thickness of 0.5 to 1.5μ and an average diameter of 10 to 45μ, selected from the group consisting of aluminum flakes, bronze flakes, tin flakes, gold flakes, silver flakes, titanium flakes, stainless steel flakes, nickel flakes, copper flakes, their alloyed metal flakes, plastic-coated metal flakes and phthalocyanine blue flakes, and ultra-fine particles having an average particle diameter of 5 to 400 mμ, the weight ratio of said flake pigments to ultra-fine particles being 1:0.05 to 1:12; uniformly dispersed in a thermosetting resin vehicle.

2. A composition according to claim 1, wherein the ultra-fine particles are selected from the group consisting of iron oxide, titanium oxide, black oxide of titanium, zirconium oxide, silicon dioxide, sand and crosslinked polymer particles.

3. A coating composition capable of producing a coating with an excellent gloss and a decorative interference color, without relying on an interference mica pigment, which comprises aluminum flake pigments having an average thickness of 0.5 to 1.5μ and an average diameter of 10 to 45μ, optional color pigments and ultra-fine particles having an average particle diameter of 5 to 400 mμ selected from the group consisting of iron oxide, titanium oxide, black oxide of titanium zirconium oxide, silicon dioxide, sand and crosslinked polymer particles, uniformly dispersed in a thermosetting resin vehicle, the weight ratio of said aluminum flake pigment to said ultra-fine particles being 1:0.05 to 1:5, the total pigment concentration being 50 wt % or less and the aluminum flake pigment concentration being 15 wt % or less with respect to the total solid weight of the composition.

* * * * *